Dec. 17, 1935.　　　A. A. EISENMAN　　　2,024,682

QUICK DETACHABLE HOSE COUPLING

Filed Sept. 15, 1933

Inventor
A. A. Eisenman.
By
Attorneys

Patented Dec. 17, 1935

2,024,682

UNITED STATES PATENT OFFICE 2,024,682

QUICK DETACHABLE HOSE COUPLING

Arthur A. Eisenman, Manitowoc, Wis.

Application September 15, 1933, Serial No. 689,589

2 Claims. (Cl. 284—19)

This invention appertains to couplings and more particularly to a quickly detachable coupling especially susceptible for use in conjunction with air hoses.

One of the primary objects of my invention is to provide a hose coupling in which the component sections thereof can be readily uncoupled or connected together, and one in which the air is automatically cut off when the sections are uncoupled.

Another salient object of my invention is to provide an improved coupling in which the sealing washers are utilized in a novel manner to preclude air leaks and to function as a seat for the valve when the sections are uncoupled.

A further object of my invention is to provide novel means whereby the parts of the coupling can be quickly detached one from the other to permit renewal of the washers, when the same become worn; the washers themselves being of novel construction to facilitate such renewal and to insure an air-tight coupling, as set forth above.

A still further object of my invention is to provide an air hose coupling of the above character, which will be durable and efficient in use, one that will be simple and easy to manufacture and one which can be placed upon the market at a reasonable cost.

With these and other objects in view, the invention consists in the novel arrangement, construction, and formation of parts, as will be hereinafter more specifically described, claimed and illustrated in the accompanying drawing, in which:—

Figure 1:
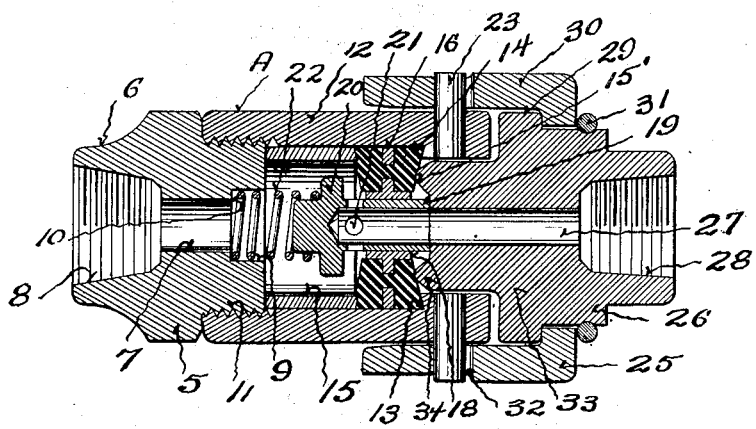
Figure 1 is a central longitudinal section through my improved coupling, showing the sections thereof connected together.

Referring to the drawing in detail, wherein similar reference characters designate the corresponding parts throughout the several views, the letter A generally indicates my improved air hose coupling, which comprises companion sections 5 and 25. The section 5 may constitute the supply end for the air and the section 25 may form the hose outlet end for the air.

As shown, the section 5 comprises a supporting head 6 having an axially disposed longitudinally extending bore 7 therethrough. The outer end of the bore is provided with interior threads 8 for connection with the air supply and the inner end of the bore is increased in diameter as at 9 to provide an annular internal shoulder 10. Detachably connected with the body 6, preferably through the medium of threads 11, is the body shell 12. In order to facilitate the connection of the body shell 12 with the body 6, the same may be provided with polygonal outer faces to form wrench engaging surfaces.

The body shell 12 adjacent to its outer end is provided with an internal annular shoulder 13 against which is fitted the novel sealing gasket 14, which will later be more fully set forth.

To hold the gasket 14 against the shoulder 13, a gasket sleeve lock 15 is provided. This sleeve abuts against the body 6 at one end and against the gasket at its opposite end. Obviously, this sleeve could be formed integral with the body 6 without departing from the spirit of my invention and in fact, such a construction is contemplated.

Referring more specifically to the gasket 14, it is to be noted that the same embodies an annular compressible body 15' which may be formed of rubber and is preferably molded from an oil resisting compound. The gasket is double-faced for a purpose, which will be later set forth, and the opposite faces thereof are concave or bevelled inwardly toward the axial center thereof. The annular rubber body can be reinforced by disc-shaped plate 16 and this plate has formed therein openings 17, so that the material from which the gasket is formed can flow therethrough and thus, be securely anchored thereto. This plate is formed centrally on a sleeve 18. The sleeve 18 slidably receives the tubular stem 19 of the valve 20. The tubular stem 19 adjacent to the valve body 20 is provided with a series of air inlet openings 21 communicating with the bore of said tubular stem.

An expansion coil spring 22 is seated against the valve 20 and against the internal shoulder 10 of the body 6 and normally functions to urge said valve on the inner face of the washer and the openings 21 interiorly of the sleeve 18. Obviously, when the valve is seated on the washer or gasket 14, the flow of air through the section 5 is prevented.

To permit the coupling of the section 5 with the section 25, the inner end of the body shell carries radially extending diametrically disposed lock pins 23, which cooperate with certain parts of the section 25, as will be later set forth. The section 25 includes the supporting body 26 provided with the axially disposed bore 27. The outer end of the bore is enlarged and provided with interior threads 28 for the reception of the air outlet hose (not shown). The outer end of the body has its outer face provided with a polygonal surface for the reception of a wrench or like object to facilitate the connection of the hose therewith. Formed exteriorly on the body intermediate its ends is an annular shoulder 29 against which is adapted to fit the rotatable sleeve nut 30. The sleeve nut 30 is held against accidental displacement by means of a snap ring 31 placed on the body 26. This sleeve nut 30 can have its outer face nurled and is adapted to fit over the forward end of the body shell 12 of the section 5. This sleeve nut is provided with bayonet slots 32 for the reception of the pins 23, and obviously, this forms an efficient and quick means for connecting the sections 5 and 25 together. If preferred, the sections can be united by coarse pitch threads.

The inner end of the body 26 is provided with a reduced extension 33 which is adapted to fit within the body shell 12 and the extreme inner face of said extension 33 has formed thereon an annular rib 34 for sealing contact with the outer face of the gasket 14.

In operation of the coupling, when the sections 5 and 25 are united, the extension 33 engages against the tubular stem 19 and moves the same inwardly against the tension of the coil spring 10. This unseats the valve 20 from off of the gasket and the openings 21 are disposed inwardly of the gasket. Consequently, a free flow of air is permitted through the coupling. Leakage of air through the coupling is positively precluded due to the sealing engagement of the gasket with the body shell 12, the gasket lock sleeve 15 and the contact rib 34.

When the section 25 is uncoupled from the section 5, the spring 10 functions to return the valve 20 into sealing contact with the gasket and flow of air through the section 5 is prevented.

Figure 2:
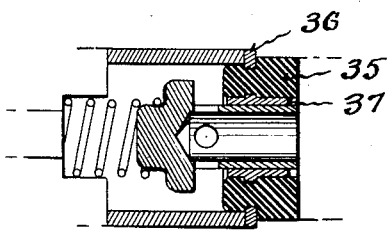
Figure 2 is a detail fragmentary longitudinal section illustrating the use of a slightly modified form of washer.

The gasket 14 can be modified within certain limits and in Figure 2 I have illustrated a slight modification thereof. In this form, I have shown a gasket body 35, which is carried by a perforated plate 36 and sleeve 37. The plate 36 is of greater diameter than the diameter of the gasket body 35 and thus, the inner end of the gasket is adapted to snugly fit within the gasket lock, and the plate 36 fits against the gasket lock and the shoulder of the body shell.

Figure 3:
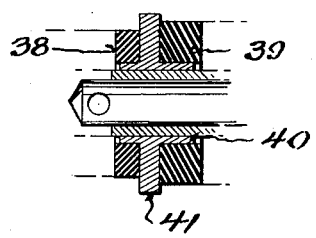
Figure 3 is a view similar to Figure 2 illustrating a still further modified form of washer.
Figure 4:
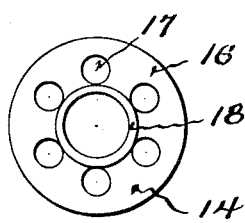
Figure 4 is a detail end elevation showing the plate or disc for carrying that form of washer illustrated in Figures 1 and 2.

In Figure 3 I utilize inner and outer gaskets or washers 38 and 39 respectively and these gaskets or washers are fitted on the opposite ends of a sleeve 40 against a centrally disposed washer plate 41.

With the construction set out above, when it is necessary to renew the washer, it is merely necessary to disconnect the body shell 12 from the supporting body 6 which leaves the gasket and gasket sleeve lock 15 free and the same can be readily pushed out of the inner end of said body shell.

From the foregoing description, it can be seen that I have provided an exceptionally simple and durable form of hose coupling.

Changes in details may be made without departing from the spirit or the scope of this invention, but what I claim as new is—

1. A hose coupling comprising a pair of companion sections, means for detachably connecting said sections together, one of said sections including a supporting body, a body shell detachably connected therewith having an internal shoulder adjacent to its outer end, a gasket fitted against said shoulder having an axially disposed sleeve, means for holding the gasket against said shoulder when the body shell is connected with the supporting body, a tubular valve stem slidably mounted in the sleeve, a valve carried by said stem, the stem having air inlet openings communicating with the bore thereof formed therein adjacent to the valve, spring means imposed between the supporting body and the valve normally urging the valve into sealing contact with the inner face of the gasket and the opening of the stem interiorly of the gasket sleeve, an extension formed on the other section for sealing contact with the outer face of the gasket when the sections are coupled, said extension engaging the tubular stem and forcing the valve out of engagement with the gasket and the openings inwardly of said gasket when said sections are coupled, the opposite faces of said gasket being concave.

2. A hose coupling comprising a pair of companion sections, means detachably connecting said sections together, one of said sections including an outer coupling and an inwardly projecting body shell having an internal shoulder adjacent to its inner end, a gasket fitted against said shoulder having an axially disposed sleeve, means holding the gasket against said shoulder, a tubular valve stem slidably mounted in the sleeve, a valve carried by said stem, the stem having air inlet openings communicating with the bore thereof formed therein adjacent to the valve, spring means imposed between the supporting body and the valve normally urging the valve into sealing contact with the inner face of the gasket and the openings of the stem interiorly of the gasket sleeve, an extension formed on the other section for sealing contact with the outer face of the gasket when the sections are coupled, said extension engaging the tubular stem and forcing the valve out of engagement with the gasket and the openings inwardly of said gasket when said sections are coupled.

ARTHUR A. EISENMAN.